Jan. 9, 1968   M. KLEIN ETAL   3,362,263
HONING OF SAW TEETH
Filed May 18, 1966
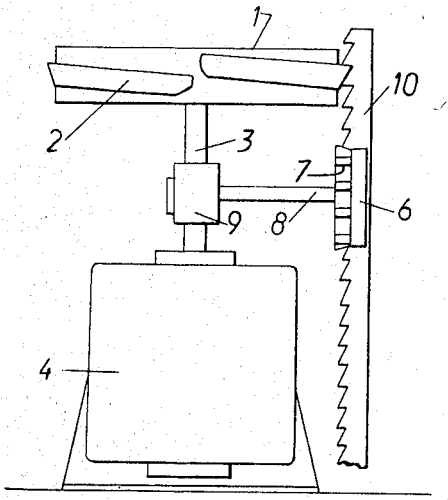
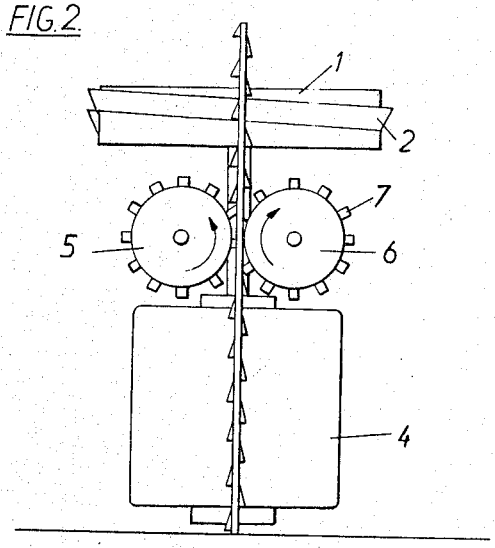
Inventors
MEIR KLEIN
MEIR DROR
By
OSTROLENK, FABER, GERB & SOFFEN
Attorneys

United States Patent Office 3,362,263
Patented Jan. 9, 1968

---

3,362,263
HONING OF SAW TEETH
Meir Klein, 11 Flierberg St., Tel Aviv, Israel, and Meir Dror, 15 Habroshim St., Kiriat Bialik, Israel
Filed May 18, 1966, Ser. No. 551,044
4 Claims. (Cl. 76—59)

This invention relates to the honing of saw teeth, and in particular to the honing of the teeth of band or circular saws or the like.

It is an object of the present invention to provide new and improved means for the honing of saw teeth.

According to the present invention, there is provided a honing mechanism for the honing of saw teeth comprising a rotary device, a helical honing edge of the rotary device adapted to engage a tooth of the saw and means for rotating the device so as simultaneously to hone said tooth and to advance a succeeding tooth into position for honing.

Preferably the honing mechanism is associated with a mechanism for setting of the saw teeth which comprises a pair of setting wheels located side by side so as to rotate in the same plane and being respectively provided with sets of radially directed cogs which, in the absence of an interposed saw are adapted to interengage with each other, drive means for driving the wheels in respectively opposite senses and means for displacing the saw between the cogs so that the cog sets respectively engage and bend alternate teeth of the saw in opposite directions.

The invention will now be described by way of example and with reference to the accompanying drawings, in which:

FIG. 1 is a side elevation of a honing mechanism in accordance with the invention, and FIG. 2 is a front elevation of the mechanism shown in FIG. 1.

As seen in the drawings, a honing mechanism comprises a rotatable cylinder 1 on the surface of which is formed a helical honing edge 2. The rotary cylinder 1 is associated with a drive axle 3 which is driven from a motor 4.

The honing mechanism is associated with a setting mechanism which comprises a pair of wheels 5 and 6, each of which is provided with radially extending cogs 7. The wheels 5 and 6 are respectively driven by axles 8 coupled by means of a worm drive 9 to the axle 3, in such a manner that the wheels 5 and 6 are arranged to rotate in opposite senses.

A band saw 10 is supported by means, for example, of two pulleys (not shown), so as to be freely displaceable along its length between the setting wheels 5 and 6.

In use a rotary drive is imparted to the cylinder 1 from the motor 4 and as a result the helical honing edge 2 engages the teeth of the band saw 10 honing these teeth and, with each complete rotation of the cylinder 1, advancing the band saw 10 by one tooth. At the same time, the setting wheels 5 and 6 are caused to rotate at a speed which is synchronized to the speed of rotation of the cylindrical support 1 in such a manner that successive teeth of the band saw 10 are respectively struck by respective cogs of the wheels 5 and 6, thereby setting the teeth (i.e. displacing successive teeth in opposite directions).

In this way, the combined honing and setting mechanism can simultaneously hone and set the teeth of the band saw.

Whilst in the arrangement specifically described above, the helical honing edge has been illustrated as being supported on a cylindrical support, it will be readily appreciated that this edge can be equally well supported on a support of other shapes such as, for example a conical support. Furthermore, it should be clearly understood that the invention is not limited to setting means as described above. Other forms of setting means can be employed such as, for example, standard setting means where reciprocating hammers are used to bend the saw teeth in alternate directions.

Furthermore, while in the above referred to specific arrangement the pitch of the helical honing edge is such that each rotation of the cylinder 1 results in the advance of the band saw 10 by one tooth, the employment of a honing edge whose pitch is a multiple of that used above will result in the advance of the band saw by an appropriate number of teeth with each rotation of the cylinder. In a particular practical embodiment a honing edge whose pitch is double the tooth spacing can be employed. In this case with successive rotations of the cylinder the even and the odd teeth are respectively honed.

We claim:

1. A honing mechanism for the honing of saw teeth, comprising a rotary device, a helical honing edge of the rotating device adapted to engage a tooth of the saw and means for rotating the device so as to simultaneously hone said tooth and to advance a succeeding tooth into position for honing.

2. A honing mechanism according to claim 1, wherein the honing edge has a helical pitch equal to the spacing of the saw teeth.

3. A honing mechanism according to claim 1, wherein the honing edge has a helical pitch which is a multiple of the spacing of the saw teeth.

4. In combination, a honing mechanism according to claim 1 and a setting mechanism comprising a pair of setting wheels located side by side so as to rotate in the same plane and being respectively provided with sets of radially directed cogs which, in the absence of an interposed saw, are adapted to interengage with each other, drive means for driving the wheels in respectively opposite senses and means for displacing the saw between the cogs so that the cog sets respectively engage and bend alternate teeth of the saw in opposite directions.

References Cited

UNITED STATES PATENTS

| 7,632 | 4/1877 | Shaw | 76—39 |
| 787,519 | 4/1905 | Lindfors | 76—59 |
| 832,502 | 10/1906 | Randall | 76—59 |
| 1,878,396 | 9/1932 | Hawes | 76—59 |

GRANVILLE Y. CUSTER, JR., *Primary Examiner.*